(12) United States Patent
Webb et al.

(10) Patent No.: US 8,706,813 B2
(45) Date of Patent: Apr. 22, 2014

(54) POPULATING ONLINE FORUMS

(75) Inventors: Brandyn Webb, Oceanside, CA (US); Kirk B. Gould, Cupertino, CA (US); Michael Kaplan, Santa Cruz, CA (US)

(73) Assignee: Adobe Systems Incorporated, San Jose, CA (US)

( * ) Notice: Subject to any disclaimer, the term of this patent is extended or adjusted under 35 U.S.C. 154(b) by 37 days.

(21) Appl. No.: 13/396,490

(22) Filed: Feb. 14, 2012

(65) Prior Publication Data
US 2013/0212174 A1 Aug. 15, 2013

Related U.S. Application Data

(60) Division of application No. 12/209,108, filed on Sep. 11, 2008, now abandoned, which is a continuation of application No. 09/788,526, filed on Feb. 21, 2001, now Pat. No. 7,502,825.

(51) Int. Cl.
| | | |
|---|---|---|
| *G06F 15/16* | (2006.01) | |
| *H04L 12/58* | (2006.01) | |
| *H04L 29/12* | (2006.01) | |
| *G06Q 10/10* | (2012.01) | |

(52) U.S. Cl.
CPC .............. *H04L 12/58* (2013.01); *H04L 12/581* (2013.01); *H04L 12/586* (2013.01); *H04L 29/1215* (2013.01); *G06Q 10/101* (2013.01)
USPC ....................................................... 709/205

(58) Field of Classification Search
CPC ... H04L 12/58; H04L 12/581; H04L 29/1215; H04L 12/586; G06Q 10/101
USPC ....................................................... 709/205
See application file for complete search history.

(56) References Cited

U.S. PATENT DOCUMENTS

| | | | |
|---|---|---|---|
| 5,784,561 A | 7/1998 | Bruno et al. | |
| 5,880,731 A | 3/1999 | Liles et al. | |
| 6,081,830 A | 6/2000 | Schindler | |
| 6,118,456 A | 9/2000 | Cooper | |
| 6,219,045 B1 | 4/2001 | Leahy et al. | |
| 6,226,669 B1 | 5/2001 | Huang et al. | |
| 6,336,133 B1 | 1/2002 | Morris et al. | |
| 6,339,784 B1 | 1/2002 | Morris et al. | |
| 6,400,381 B1 | 6/2002 | Barrett et al. | |
| 6,425,012 B1* | 7/2002 | Trovato et al. ................. | 709/227 |
| 6,442,590 B1 | 8/2002 | Inala et al. | |
| 6,480,885 B1* | 11/2002 | Olivier .......................... | 709/207 |
| 6,487,584 B1 | 11/2002 | Bunney | |
| 6,651,086 B1 | 11/2003 | Manber et al. | |
| 6,750,881 B1* | 6/2004 | Appelman ..................... | 715/733 |
| 6,832,245 B1 | 12/2004 | Isaacs et al. | |
| 6,848,997 B1* | 2/2005 | Hashimoto et al. ............. | 463/42 |
| 2003/0014489 A1 | 1/2003 | Inala et al. | |
| 2004/0054729 A1 | 3/2004 | Fukuizumi et al. | |
| 2005/0004984 A1 | 1/2005 | Simpson | |
| 2005/0204007 A1 | 9/2005 | McGregor et al. | |
| 2005/0235038 A1 | 10/2005 | Donatella et al. | |

* cited by examiner

*Primary Examiner* — Peter Shaw
(74) *Attorney, Agent, or Firm* — Finch & Maloney PLLC (57) ABSTRACT

In general, in one aspect, a forum for user interaction is provided. A clone of the forum is created, thereby allowing any number of users to be in the same forum while limiting the number of users in each instance of the forum. It is determined whether a relationship exists between a user entering the forum and one or more other users entering the forum or with one or more other users already in the forum. If a relationship exists, the user entering the forum is placed in a clone of the forum based on the relationship.

11 Claims, 6 Drawing Sheets

POPULATING ONLINE FORUMS

CROSS-REFERENCE TO RELATED APPLICATIONS

This application is a divisional of, and claims priority to, U.S. patent application Ser. No. 12/209,108, entitled POPULATING ONLINE FORUMS, to inventors Brandyn Webb et al., filed on Sep. 11, 2008, which is a continuation of U.S. patent application Ser. No. 09/788,526, entitled POPULATING ONLINE FORUMS, to inventors Brandyn Webb et al., filed on Feb. 21, 2001 and issued as U.S. Pat. No. 7,502,825. The disclosure of the foregoing application is incorporated here by reference in its entirety.

BACKGROUND

This invention relates to distributed computer services having online forums.

An online forum is a communications interchange in which people may communicate with others through successive electronic transmissions between respective computer systems. An online forum may be implemented on a distributed computer system such as that shown in FIG. 1. Forum participants may be scattered across a large geographic area and typically communicate with one or more central server systems 100 through respective client systems 102 (e.g., a personal or laptop computer). In practice, the server system 100 typically is not a single monolithic entity, but rather is a network of interconnected server computers, possibly physically dispersed from each other. In such a case, the individual servers are interconnected by a network of communication links (e.g., the Internet).

Figure 1:
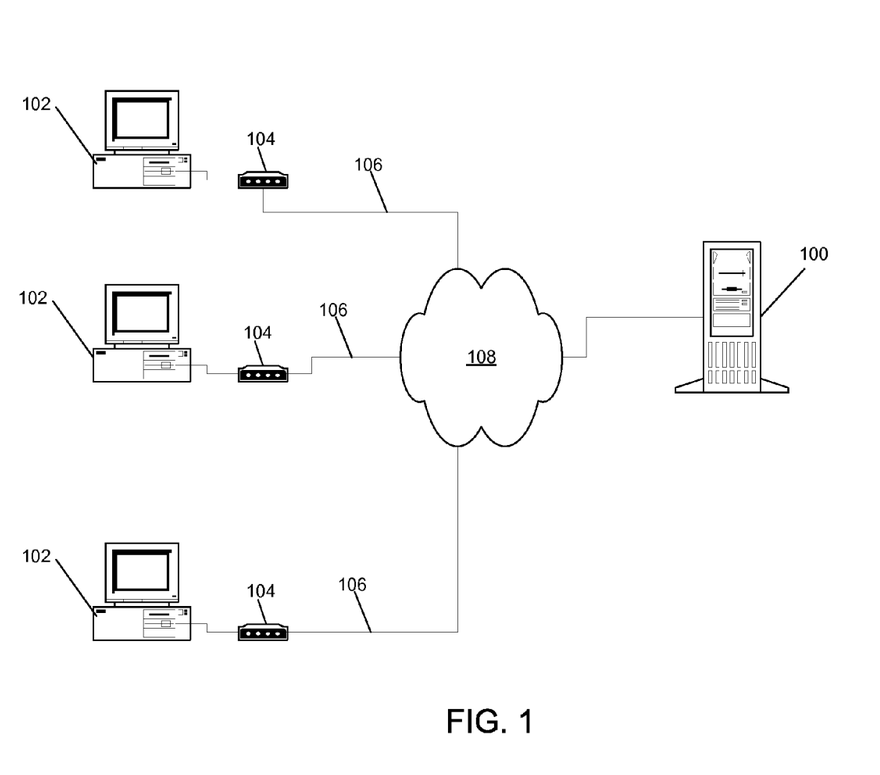
FIG. 1 is a block diagram of a computer network.

Each client system 102 runs client software that allows it to communicate in a meaningful manner with corresponding software running on the server 100. The client systems 102 communicate with the server 100 through various channels, such as a modem 104 connected to a telephone line 106 or a direct Internet connection using a transfer protocol such as TCP/IP (Transfer Control Protocol/Internet Protocol) that may be connected to a network 108. The server 100 is responsible for receiving input from the client systems 102 through an input device, for example, an input buffer, manipulating the collective body of input information (and possibly information from other sources) into a useful format, and retransmitting the formatted information back to one or more clients 102 for output to an output device, for example, a display screen.

Figure 2:
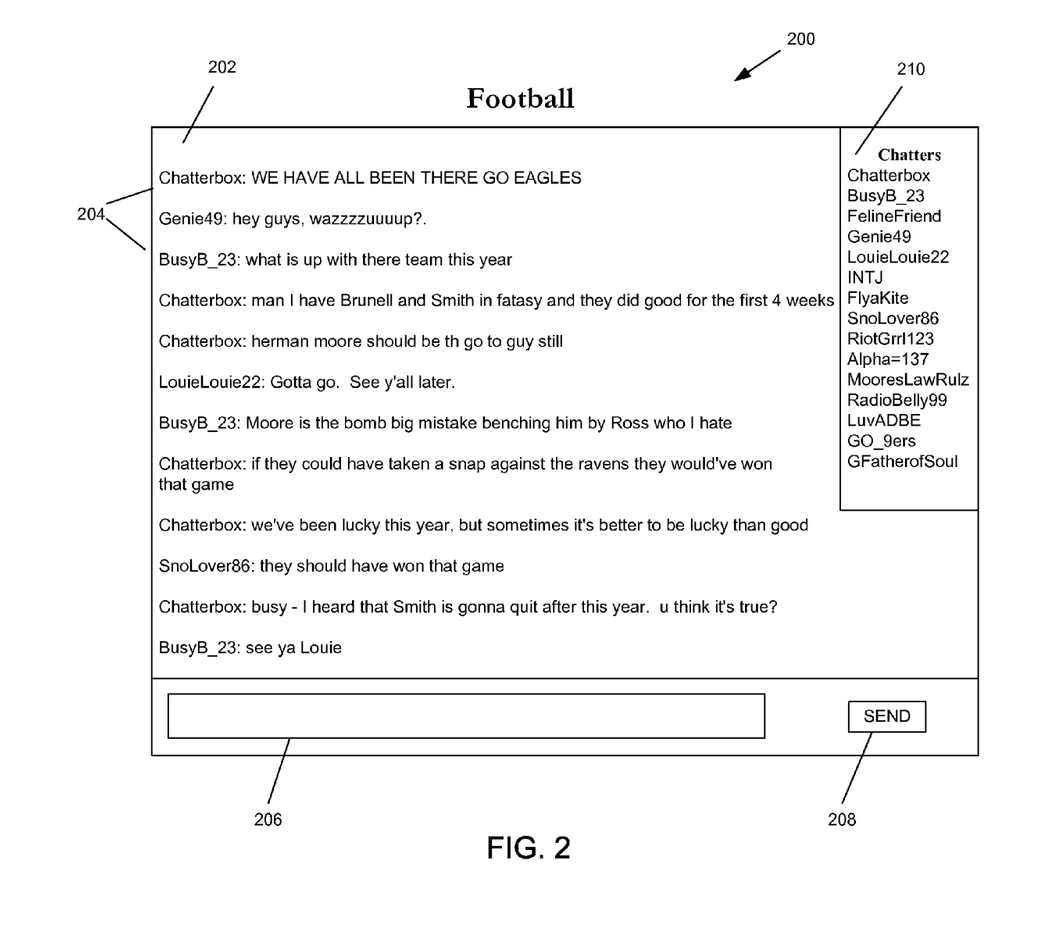
FIG. 2 is an exemplary screenshot of a chat room dialog.

As shown in FIG. 2, one type of forum is a "chat room" 200 in which various participants 204 (e.g., "Chatterbox," "BusyB_23," etc.) may enter text that appears in a scrolling window 202 on each participant's computer display screen. In the example in FIG. 2, the chat room 200 has 15 participants whose aliases (or "screen names") are listed in a scrolling window 210. A participant may respond to the comment of another participant 204 by entering text in an edit box 206 and activating (e.g., by clicking with a pointing device, such as a mouse) a SEND button 208 in the user interface, by entering a keyboard command, or by some other action. In response, the text in the scrolling text window 202 scrolls upwards and the newly entered text is displayed at the bottom of the scrolling text window 202. In the illustrated example, the last participant to enter a comment was BusyB_23, who typed "see ya Louie."

In the example in FIG. 2, the chat room 200 has been designated by the server 100 as a forum devoted to the discussion of "Football" in order to attract participants who want to discuss, for example, issues, news, or gossip pertaining to football. The server 100 may create various different chat rooms dedicated to different discussion topics, so that users of the computer service may enter a particular room and discuss a topic with other participants who desire to discuss the same topic. The chat room 200 shown in FIG. 2 is "public," meaning that anyone may enter the chat room, and entry to the room is not restricted by the server 100. Since entry into a public chat room is unrestricted, an unlimited number of users may enter the room. When too many users are in the room and/or are sending a high volume of messages, however, the message traffic become too dense for meaningful discussion to occur, and a participant experiencing such a cacophony may quickly become unsatisfied with the chat room.

Another type of forum is a three-dimensional (3D) virtual world, which presents a 3D graphical scene to users. Multiple users, represented by different avatars in the graphical scene, may enter and navigate the virtual world, interacting with the world and with other users. The interaction with other users may be through an associated chat room or through other textual or graphical communications, for example, by causing the avatars representing the users to interact in the virtual world. As with the presence of too many participants in a chat room, too many users in a virtual world may result in a visual cacophony such that distinguishing the different avatars is difficult, or such that the 3D rendering engine becomes overloaded and cannot update the graphical representation at an acceptable rate.

SUMMARY

In general, in one aspect, a forum for user interaction is provided. A clone of the forum is created, thereby allowing any number of users to be in the same forum while limiting the number of users in each instance of the forum. It is determined whether a relationship exists between a user entering the forum and one or more other users entering the forum or with one or more other users already in the forum. If a relationship exists, the user entering the forum is placed in a clone of the forum based on the relationship.

Implementations can include one or more of the following advantageous features.

Information may be received from the user entering the forum, and from one or more other users, indicating one or more forums the user and the other users, respectively, have been in. A relationship then exists between the user entering the forum and another user, if the user and the other user both have been in the same second forum, where the second forum is different from the forum the user is entering.

Information may be received from the user entering the forum, and from one or more other users, indicating what clones of what forums the user and the other users, respectively, have been in. A relationship then exists between the user entering the forum and another user, if the user and the other user both have been in the same clone of a forum.

Information may be received from the user entering the forum, and from one or more other users, indicating the domain name of the user's address, and the domain names of the other users' addresses, respectively. A relationship then exists between the user entering the forum and another user, if the user entering the forum and the other user use the same domain name.

Information may be received from the user entering the forum, and from one or more other users, indicating a country associated with the user's address, and indicating a country associated with each of the other user's addresses. A relationship then exists between the user entering the forum and another user if the user entering the forum and the other user have addresses associated with the same country.

Information may be received from the user entering the forum, and from one or more other users, indicating a language in which the user prefers to communicate. A relationship then exists between the user entering the forum and another user, if the user entering the forum and the other user prefer to communicate in the same language.

An indication may be received from the user entering the forum or from one or more other users that a relationship exists between the user entering the forum and one or more other users. The user may be placed in a clone with another user with whom a relationship exists. The user entering the forum may be placed in a clone other than a clone containing a designated user with whom a relationship exists. The user entering the forum may be placed in a clone with another user with whom a relationship exists and who most recently entered the forum. The number of users in each instance of the forum may be limited to a maximum number. The number of users in each instance of the forum may be limited to a threshold number, except if a relationship exists between the user entering the forum and one or more other users, and the user entering the forum may be placed in a clone with more than the threshold number of users only if a relationship exists between the user and one or more of the other users in the clone or entering the clone.

The forum may be an interactive forum maintained by a system of one of more computers in which users interact by submitting messages and reading messages from other users as they are submitted. The forum may be an interactive virtual world maintained by a system of one or more computers where users interact by moving avatars, and each user may have one or more avatars in the virtual world, and observing the movement of the avatars in the virtual world. The forum may be accessed by users from two or more separate computers operatively coupled to each other over a network connection.

These and other features may be used in the forum for user interaction, as described, or by some other network connected computer environment. Implementing these features may be useful in, for example, managing and optimizing the movement and placement of users as they navigate a multiple one or more online forums.

These features may be implemented using, for example, a method or a process, a device, an apparatus or a system, or software stored on a computer medium.

The details of one or more embodiments are set forth in the accompanying drawings and the description below. Other features and advantages will become apparent from the description, the drawings, and the claims.

DETAILED DESCRIPTION

When too many users are in an online forum or when the data traffic volume between participants in the forum is too high, confusion and decreased communication may result. Accordingly, online forums that clone themselves when they become full are provided. New participants seeking to join the forum are then admitted into a clone of the forum, so that a forum does not become overloaded with users.

Multiple instances of a forum devoted to a particular topic may be created and exist on an online service, so that a user may enter any one of the instances and interact with other users similarly interested in the forum topic. When the instances of a forum devoted to a particular topic are on the verge of becoming full and an additional user seeks to join the forum, an instance of the forum may be cloned to create space for new users. Thus, new users may join the forum by entering a clone, and existing of instances of the forum do not become overloaded.

Figure 3:
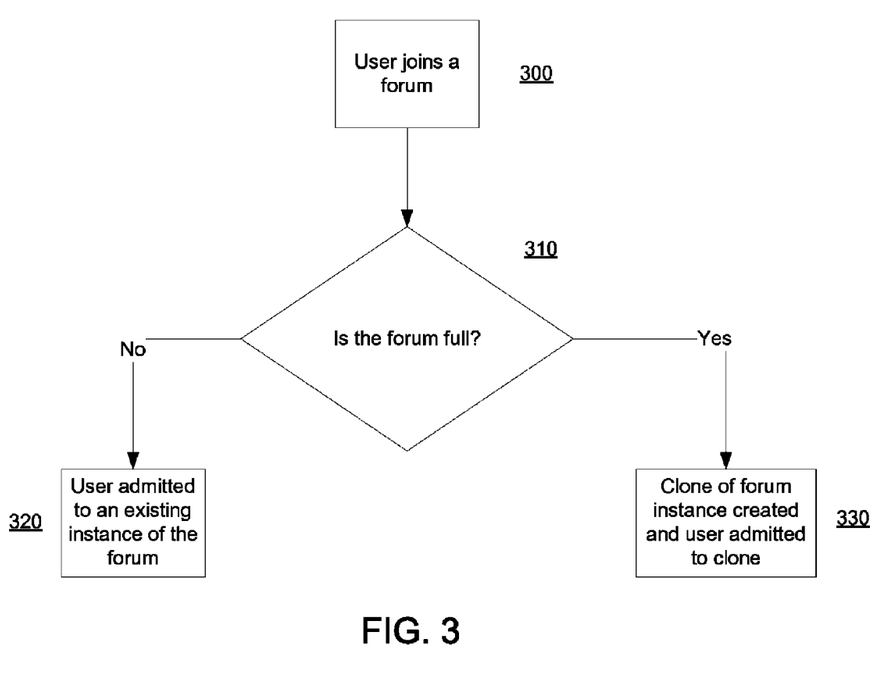
FIGS. 3-6 are flow charts of methods of allocating users to a chat room instance.
Like reference symbols indicate like elements.

As shown in FIG. 3, an online forum devoted to a particular topic may exist on a computer service, and a single or multiple instances of that forum may exist. When a user of the computer service joins a forum (300), the computer service determines whether or not all of the instances of the forum are full (310). An instance of the forum may be deemed full based on a variety of criteria. For example, an instance of a forum may be deemed full if the number of participants in the instance equals or exceeds a designated number of participants for the instance. Alternatively, an instance of the forum may be deemed full if the activity of the participants in the instance exceeds a threshold. For example, if the message rate or the data transfer rate over a period of time in a chat room instance exceeds a threshold, the instance of the chat room may be deemed full, or if the frame update rate of a 3D virtual world falls below a threshold because the rendering engine is overloaded by the user activity, the 3D virtual world may be deemed full.

If one or more of the existing instances of the forum are not full, the user joining the forum is placed in an existing instance of the forum by the computer service (320). The computer service may place the user in any of the non-full instances of the forum, but generally will place the user in the least full instance of the forum.

If all of the existing instances of the forum are full, the computer service creates a new instance of the forum (a "clone"), devoted to the same topic as all the other instances of the forum, and places the joining user in the clone (330). Each instance of a forum, including a clone, is devoted to the same topic as any other instance of the forum, so that a user in any instance may interact with other similarly interested users regardless of what particular instance of the forum the user is in. A forum participant may be completely ignorant of the fact that different instances of a forum exist. Thus, 30 instances of a "football" forum, each containing 15-20 participants, may exist on a computer service, but the computer service may give no indication to a participant that any instance exists other than the instance the participant is in.

If two or more users meet in a forum and engage in a conversation, or otherwise interact with each other in the forum and become associated with each other, they may wish to continue their interaction in a different forum dedicated to a different topic. For example, if two users (User A and User B) meet in a 3D virtual world simulating the deck of a submarine, they may both decide to go to a virtual world simulating the control room of a submarine, or they may both decide to leave the virtual submarine world altogether and go together to a haunted house virtual world. If multiple instances of the second forum (the submarine control room or the haunted house virtual world, in this example) exist, it is possible that the two users may be placed in different instances of the second forum, thus denying them the opportunity of further communication with each other in the second forum. Accordingly, the computer service may preferentially place a user entering a second forum in a particular instance of the second forum, in order to permit users to continue an interaction in the second forum.

Figure 4:
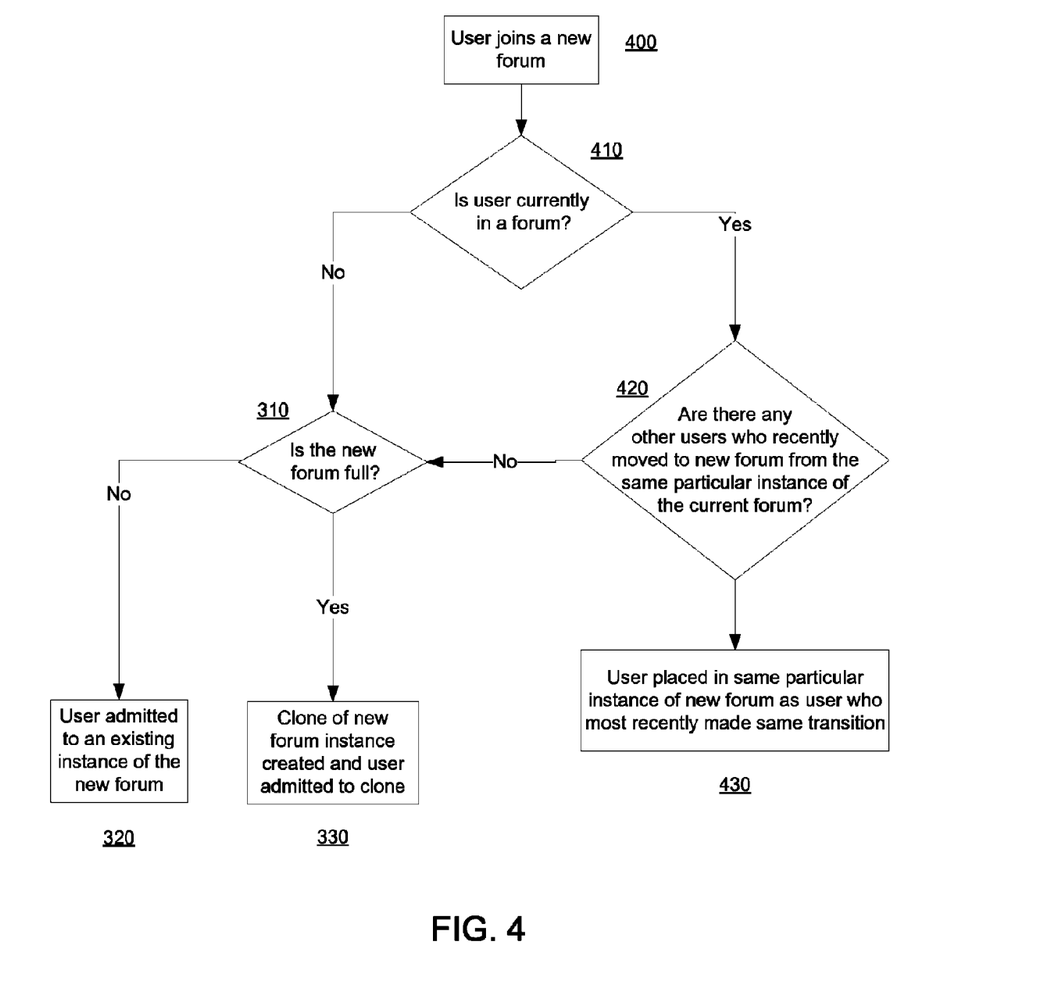

As shown in FIG. 4, when a user joins a forum (a new forum) (400), the computer service receives a string from the user containing information about the user and/or about the forums the user has been in. For example, the string may indicate which forum, if any, the user is coming from (a current forum) (410). If the user is not coming from any forum (e.g., if the user is entering the computer service for the first time) step 310 and subsequent steps of FIG. 3 are followed. If the user is coming from a current forum, the computer service may also receive a string indicating which particular instance of the current forum the user is in. The user may aware that the string is being transmitted to the server (e.g., if the user may actively cause the string to be sent) or may be unaware that the string is being sent (e.g., if the string is automatically sent from the user's client computer).

The computer service then searches a cache to determine whether other users have recently moved to the new forum from the same particular instance of the current forum (420). If the search results are negative, step 310 and subsequent steps of FIG. 3 are followed. If the search results are positive, the computer service determines which other user most recently made such a move, and may then place the user in the same instance with the other user (430), subject to space availability in the new forum. Thus, users may follow each other from one forum to another and may be placed in the same instance of a new forum, where they may continue communicating with each other, rather than randomly being placed in different instances of the new forum, where they might lose communication with each other.

Other information about the user and/or the forums and clones the user has been in may be received in the string by the server, and may be used to preferentially place the user in a clone. For example, the string may contain information about the address of the user, where the address may be a physical address, including the country the user is in, or where the address may be an online address, (e.g., an email address, internet protocol address, or domain name of a server the user is connected to). The string may contain information about the language in which the user prefers to communicate.

Figure 5:
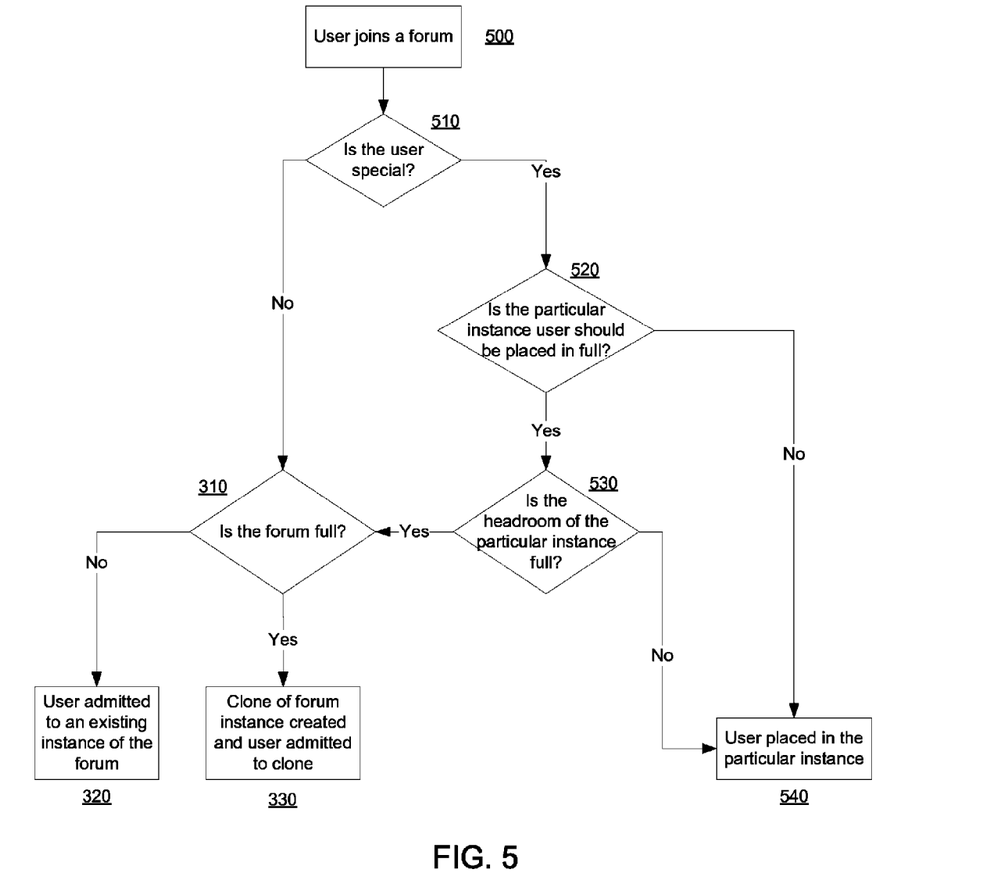

As shown in FIG. 5, the computer system may reserve extra capacity (or "headroom") in instances of a forum, such that special users may be placed in an instance of a forum, even if the instance would otherwise be deemed full. Users may be special users by virtue of an relationship with each other that deems that they should be placed in the same instance of a forum, so that they may continue a prior or currently existing interaction. For example, if two users in an instance of a submarine virtual world decide to go together to haunted house virtual world, the entry of the first user into an instance of the haunted house virtual world may cause the forum instance to become "full," thus preventing the entry of additional users. If the second user is special, however, the second user may be placed in the same instance of the new forum as the first user, even though non-special users cannot enter the instance.

When a user joins a forum (500), the computer service may determine whether or not the user is special (510). If not, step 310 and subsequent steps of FIG. 3 are followed. If the user is special, the computer service determines if the particular instance of the forum in which the special user should be placed is full (520). If not, the special user is placed in the particular instance (530). If the particular instance is full, the computer service determines if the headroom of the particular instance is full (540). The headroom of an instance may be deemed full if the number of participants in the instance equals or exceeds a designated absolute maximum number of participants for the instance. The designated absolute maximum is greater than the designated maximum number of participants that would cause the instance to be deemed full. Alternatively, the headroom of an instance of the forum may be deemed full if the activity of participants in the instance exceeds an absolute maximum threshold. If the headroom of the particular instance is not full, the special user is placed in the particular instance (530). If the headroom of the particular instance is full, step 310 and subsequent steps of FIG. 3 are followed.

Two or more users who have met in a forum, or who otherwise have a relationship with each other, may wish to join and communicate with each other in a forum. In order to communicate with each other, the users should all be in the same instance of the forum. To this end, users may indicate to the server that they wish to be associated with each other by becoming members of a "clan." The computer service may then preferentially place members of a clan in the same instance of a forum.

Figure 6:
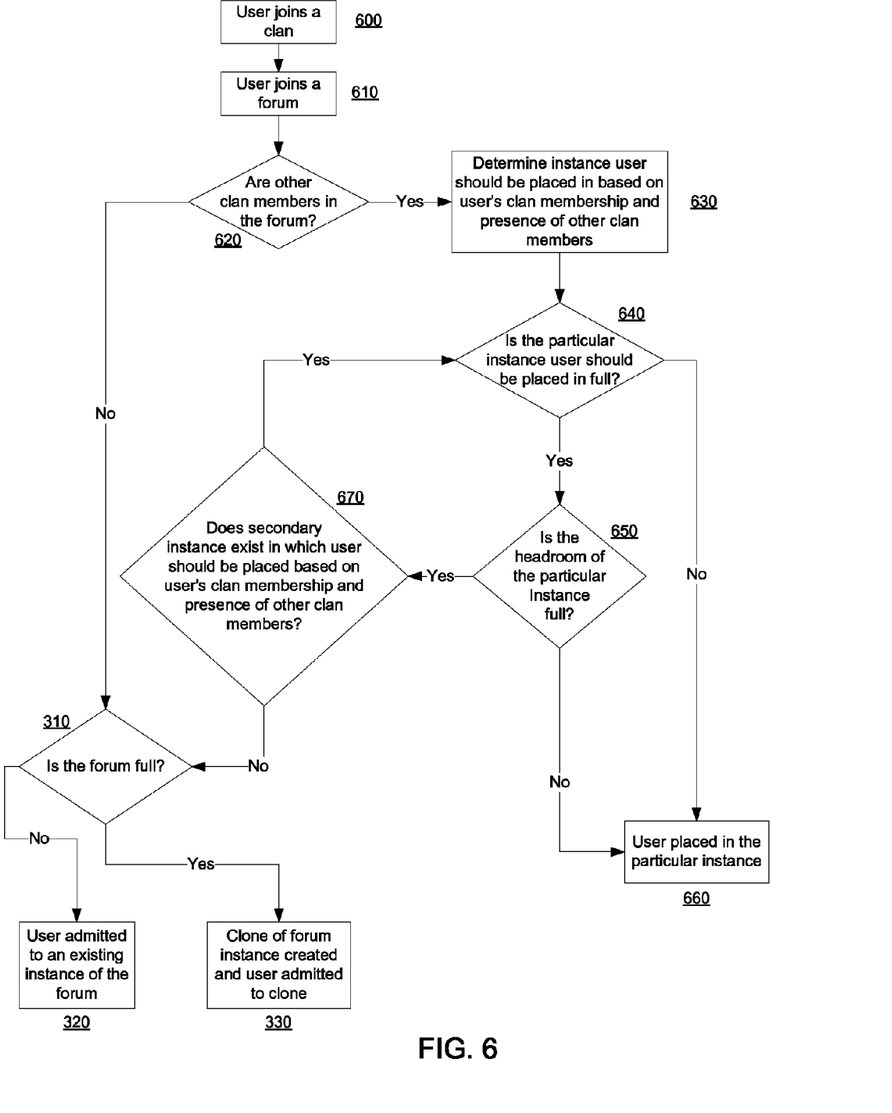

As shown in FIG. 6, a user may indicate to the computer service that the user wishes to be associated with a clan of one or more other users (600). The user may indicate this desire either before of after entering a forum of the computer service. The user may remain a member of the clan only while the user is in a forum or logged on to the computer service, or the user may remain a member of the clan even after logging off the computer service, such that the user's clan membership survives logging on/off the computer service multiple times. If a user is a member of a clan and the user enters a forum (610), the computer service determines if any other users of the same clan are in the forum (620). If not, step 310 and subsequent steps of FIG. 3 are followed. If so, the computer service attempts to place the user in a particular instance of the forum based on the user's clan membership and the presence of other clan members in the forum. For example, the computer service may attempt to place the user in the instance of the forum that has the greatest number of other clan members in it, or it may attempt to place the user in the instance of the forum who most recently entered by a clan. Because the user is preferentially placed, the user is a special user. The computer service determines the instance the user should be placed in based on the user's membership in the clan and based on the presence of other clan members (630), and then determines if that particular instance is full (640). If the instance is not full, or even if it is, but if the computer service nevertheless determines that the headroom of the particular instance is not full (650), the user is placed in that particular instance (660). If, however, the computer service determines that the particular instance is full and that the headroom of the instance is full, then the computer service determines whether a secondary preference exists for an instance in which the user should be placed (670). For example, the computer service may try to place a clan member in the instance of a forum that has the greatest number of other clan members in it. If instance A of the forum has twenty clan members but is full, including headroom, the user may be placed in instance B that has seven clan members rather than in instance C that has zero clan members. If a secondary instance preference exists, then step 640 and subsequent steps are followed. If a secondary preference does not exist, then step 310 and subsequent steps of FIG. 3 are followed. A secondary preference may not exist if, for example, three instances of the forum exist, but all the member of the clan are in one instance and that instance is full, including its headroom, while the other two instances are not full and do not contain any clan members. In this example, the user cannot be placed in the preferred instance because it is full, but since there are no clan members in either of the other two instances, neither one of them is preferred over the other.

A user may also indicate to the computer service that the user does not want to interact with another user of the computer service. For example, if another user harasses the user in the forum, the user may wish to leave the clone of the forum containing the harassing user, but may wish to still be able to interact with other, non-harassing users in the forum. After the user indicates a desire not to be placed in a clone of a forum containing a designated user, the user may be preferentially placed in a clone of the forum only if it does not contain the designated user. The designated user also may be prevented from being placed in a clone of a forum if it contains a user who has indicated a preference not be in a clone with the designated user.

The techniques, methods, and systems described here may find applicability in any computing or processing environment in which users may communicate using a distributed computer system. Various implementations of the systems and techniques described here may be realized in digital electronic circuitry, or in computer hardware, firmware, software, or in combinations thereof. A system or other apparatus that uses one or more of the techniques and methods described here may be implemented as a computer-readable storage medium, configured with a computer program, where the storage medium so configured causes a computer system to operate on input and/or generate output in a specific and predefined manner. Such a computer system may include one or more programmable processors that receive data and instructions from, and transmit data and instructions to, a data storage system, and suitable input and output devices. Each computer program may be implemented in a high-level procedural or object-oriented programming language, or in assembly or machine language if desired; and in any case, the language may be a compiled or interpreted language. Suitable processors include, by way of example, both general and special purpose microprocessors.

Generally, a processor will receive instructions and data from a read-only memory and/or a random access memory. Storage deices suitable for tangibly embodying computer instructions and data include all forms of non-volatile memory, including semiconductor memory devices, such as EPROM, EEPROM, and flash memory devices; magnetic disks such as internal hard disks and removable disks; magneto-optical disks; and CD-ROM disks.

These elements also can be found in a conventional desktop or workstation computer as well as other computers suitable for executing computer programs implementing the methods described here, which can be used in conjunction with any content viewing or manipulation software, or any other software capable of displaying portions of a larger body of content. Any of the foregoing may be supplemented by, or implemented in, specially designed ASICs (application specific integrated circuits).

It should be understood that the above detailed description and specific examples are given by way of illustration only, since various changes and modifications will become apparent to those skilled in the art from this detailed description.

For brevity, several elements in the figures described above are represented as monolithic entities. As would be understood by one skilled in the art, however, these elements each may include numerous interconnected computers and components designed to perform a set of specified operations and/or dedicated to a particular geographical region.

Other embodiments are within the scope of the following claims.

What is claimed is:

1. A method for managing an online service in which users interact with each other, the method comprising:
   creating a first forum having multiple instances thereof, wherein a first user is a current member of a particular instance of the first forum;
   creating a second forum having multiple instances thereof, wherein a second user is a current member of a particular instance of the second forum;
   receiving a request from the second user to join the first forum;
   finding the first user in a cache of users who have recently moved to the first forum from the particular instance of the second forum and identifying an interaction that occurred between the first and second users at a time when the first user was a member of the particular instance of the second forum; and
   in response to identification of the interaction and the request from the second user, placing the second user in the particular instance of the first forum.

2. The method of claim 1, further comprising:
   receiving a first string of information about the first user, wherein the first string of information indicates that the first user was previously a member of the particular instance of the second forum; and
   receiving a second string of information about the second user, wherein the second string of information indicates that the second user also came from the particular instance of the second forum.

3. The method of claim 1, further comprising:
   receiving a first string of information about the first user from a client computer of the first user, wherein the first string of information indicates that the first user was previously a member of the particular instance of the second forum; and
   receiving a second string of information about the second user from a client computer of the second user, wherein the second string of information indicates that the second user also came from the particular instance of the second forum.

4. The method of claim 1, further comprising:
   receiving a first string of information about the first user from a client computer of the first user, wherein the first string of information indicates that the first user was previously a member of the particular instance of the second forum; and
   receiving a second string of information about the second user from a client computer of the second user, wherein the second string of information indicates that the second user also came from the particular instance of the second forum,
   wherein the first and second strings of information are automatically sent from the client computers of the first and second users, respectively.

5. The method of claim 1, further comprising:
   determining that space availability exists in the particular instance of the first forum before placing the second user in the particular instance of the first forum.

6. A server system comprising one or more server computers implementing an online service, wherein each server computer is programmed to perform operations comprising:
   creating a first forum on the online service having multiple instances thereof, wherein a first user is a current member of a particular instance of the first forum;
   creating a second forum on the online service having multiple instances thereof, wherein a second user is a current member of a particular instance of the second forum;

receiving a request from the second user to join the first forum;

finding the first user in a cache of users who have recently moved to the first forum from the particular instance of the second forum and identifying an interaction that occurred between the first and second users at a time when the first user was a member of the particular instance of the second forum; and in response to identification of the interaction and the request from the second user, placing the second user in the particular instance of the first forum.

7. The server system of claim 6, further comprising:
a network; and
a client system in communication with the online service over the network.

8. The server system of claim 6, wherein the operations further comprise:

receiving a first string of information about the first user, wherein the first string of information indicates that the first user was previously a member of the particular instance of the second forum; and receiving a second string of information about the second user, wherein the second string of information indicates that the second user also came from the particular instance of the second forum.

9. The server system of claim 6, wherein the operations further comprise:

receiving a first string of information about the first user from a client computer of the first user, wherein the first string of information indicates that the first user was previously a member of the particular instance of the second forum; and receiving a second string of information about the second user from a client computer of the second user, wherein the second string of information indicates that the second user also came from the particular instance of the second forum.

10. The server system of claim 6, wherein the operations further comprise:

receiving a first string of information about the first user from a client computer of the first user, wherein the first string of information indicates that the first user was previously a member of the particular instance of the second forum; and receiving a second string of information about the second user from a client computer of the second user, wherein the second string of information indicates that the second user also came from the particular instance of the second forum, wherein the first and second strings of information are automatically sent from the client computers of the first and second users, respectively.

11. The server system of claim 6, wherein the operations further comprise:

determining that space availability exists in the particular instance of the first forum before placing the second user in the particular instance of the first forum.

* * * * *